US011757109B2

United States Patent
Chen et al.

(10) Patent No.: US 11,757,109 B2
(45) Date of Patent: Sep. 12, 2023

(54) HYBRID POWER SYSTEM

(71) Applicant: Ceres Intellectual Property Company Limited, Horsham (GB)

(72) Inventors: Youpeng Chen, Shandong (CN); Chao Yu, Shandong (CN)

( * ) Notice: Subject to any disclaimer, the term of this patent is extended or adjusted under 35 U.S.C. 154(b) by 0 days.

(21) Appl. No.: 17/789,105

(22) PCT Filed: Nov. 25, 2020

(86) PCT No.: PCT/IB2020/061123
§ 371 (c)(1),
(2) Date: Jun. 24, 2022

(87) PCT Pub. No.: WO2021/137041
PCT Pub. Date: Jul. 8, 2021

(65) Prior Publication Data
US 2023/0030363 A1    Feb. 2, 2023

(30) Foreign Application Priority Data
Dec. 31, 2019 (CN) .......................... 201922489880.4

(51) Int. Cl.
*H01M 8/04014* (2016.01)
*H01M 8/04111* (2016.01)
(Continued)

(52) U.S. Cl.
CPC ... *H01M 8/04022* (2013.01); *H01M 8/04067* (2013.01); *H01M 8/04111* (2013.01);
(Continued)

(58) Field of Classification Search
CPC .............. F01N 2240/02; F01N 2240/32; F01N 2340/06; F01N 5/02; H01M 2008/1293;
(Continued)

(56) References Cited

U.S. PATENT DOCUMENTS

| 6,655,325 B1 * | 12/2003 | Botti | F02B 1/12 |
| | | | 429/513 |
| 2004/0177607 A1 * | 9/2004 | Suzuki | F01N 5/00 |
| | | | 60/285 |

FOREIGN PATENT DOCUMENTS

| EP | 1030394 A2 | 8/2000 |
| EP | 1030395 A2 | 8/2000 |

(Continued)

OTHER PUBLICATIONS

WIPO; International Search Report and Written Opinion dated Jan. 28, 2021 in Application No. PCT/IB2020/061123.

*Primary Examiner* — Brian R Ohara
*Assistant Examiner* — Brent C Thomas
(74) *Attorney, Agent, or Firm* — Snell & Wilmer L.L.P.

(57) ABSTRACT

The invention provides a hybrid power system, which integrates an internal combustion engine with a solid oxide fuel cell (SOFC) stack and provides power for the vehicle through the internal combustion engine at first in the preheating stage of the SOFC stack, thereby solving the problem that an SOFC stack is unable to provide power for the vehicle in the preheating stage. At the same time, the internal combustion engine burns fuel gas, outputs high temperature exhaust gas, heats the heat exchanger with the high temperature exhaust gas, then discharges the exhaust gas from an exhaust turbine and inhales air from the outside of the system. The air first passes through an air preheater, then passes through a heat exchanger and then enters the inside of the SOFC stack, preheats the air preheater through an air pipeline and then is discharged. After multiple cycles, the preheating of the SOFC stack is completed. As the air preheater is connected to the heat exchanger in series to heat the air, the heating speed of the air entering the SOFC stack is raised, the preheating time is shortened and a quick start (Continued)

of the SOFC stack is achieved so that the SOFC stack can be used to achieve the purpose of providing power for the vehicle efficiently.

9 Claims, 2 Drawing Sheets

(51) Int. Cl.
| | |
|---|---|
| H01M 8/04082 | (2016.01) |
| H01M 8/0612 | (2016.01) |
| H01M 8/1231 | (2016.01) |
| H01M 8/04007 | (2016.01) |
| H01M 8/04701 | (2016.01) |
| H01M 8/12 | (2016.01) |

(52) U.S. Cl.
CPC ... *H01M 8/04201* (2013.01); *H01M 8/04738* (2013.01); *H01M 8/0618* (2013.01); *H01M 8/1231* (2016.02); *H01M 2008/1293* (2013.01); *H01M 2250/20* (2013.01); *H01M 2250/407* (2013.01)

(58) Field of Classification Search
CPC ....... H01M 2250/20; H01M 2250/407; H01M 8/04014; H01M 8/04067; H01M 8/04111; H01M 8/04201; H01M 8/04738
See application file for complete search history.

(56) References Cited

FOREIGN PATENT DOCUMENTS

| | | |
|---|---|---|
| EP | 1030395 A3 | 3/2004 |
| EP | 1030394 A3 | 9/2004 |
| EP | 1947723 A2 | 7/2008 |
| EP | 1947723 A3 | 10/2008 |
| WO | 9913521 A1 | 3/1999 |

\* cited by examiner

HYBRID POWER SYSTEM

This application is a national stage entry of International Patent Application No. PCT/IB2020/061123, filed 25 Nov. 2020, entitled "HYBRID POWER SYSTEM," which claims priority to Chinese Patent Application No. 201922489880.4, filed on 31 Dec. 2019, the disclosures of which are hereby incorporated by reference in their entirety.

TECHNICAL FIELD

The present invention pertains to the technical field of hybrid power, particularly to a hybrid power system.

BACKGROUND ART

An SOFC engine has a high efficiency, which can be up to 60%, and is highly applicable to fuels, but the SOFC engine needs to run above 600° C., resulting in a long start and preheating time and inability to output the rated power, i.e., inability to provide power for the vehicle in this stage.

SUMMARY OF THE INVENTION

An object of the present invention is to provide a hybrid power system to solve the problem in the prior art that the SOFC engine is unable to provide power for the vehicle in the preheating stage.

The present invention provides a hybrid power system, comprising an internal combustion engine. A first input end of the internal combustion engine is connected to a first output end of a first tee valve. An input end of the first tee valve is connected to a fuel gas feeder, and a second output end of the first tee valve is connected to a first input end of a reformer. An output end of the reformer is connected to a first input end of the SOFC stack. A first output end of the SOFC stack is connected to a second input end of the internal combustion engine. An output end of the internal combustion engine is connected to an exhaust line, which is arranged adjacent to the outer wall of a heat exchanger, and the exhaust gas generated from combustion of fuel gas in the internal combustion engine flows through the exhaust line and the reformer and then is discharged from an exhaust turbine. The exhaust turbine takes in air from an air pipeline while discharging exhaust gas, the air pipeline is connected to a second tee valve, the second tee valve is connected to an air preheater, and the air preheater is connected to the heat exchanger. An air pipeline connected to an output end of the heat exchanger is connected to a second input end of the SOFC stack, air is input into the SOFC stack through the air pipeline and discharged from an air pipeline connected to a second output end of the SOFC stack, and the air pipeline connected to the second output end of the SOFC stack is arranged adjacent to the outer wall of the air preheater. The second tee valve is further connected to a third input end of the internal combustion engine to provide air for the internal combustion engine.

The system can further comprise a catalytic converter. As before an output end of the internal combustion engine is connected to an exhaust line, which is arranged adjacent to the outer wall of a heat exchanger, and the exhaust gas generated from combustion of fuel gas in the internal combustion engine flows through the exhaust line and the reformer and then is discharged from an exhaust turbine. An output end of the internal combustion engine is connected to an exhaust line and is connected to a first input end of the catalytic converter through the exhaust line. An exhaust line at an output end of the catalytic converter is arranged adjacent to the outer wall of a heat exchanger, and the exhaust gas generated from combustion of fuel gas in the internal combustion engine flows through the exhaust line and the reformer and then is discharged from an exhaust turbine.

The system can further comprise a burner. An input end of the burner is connected to an output end of the SOFC stack, and an output end of the burner is connected to a second input end of the catalytic converter.

The system can further comprise a motor-driven turbine connected to the exhaust turbine in series and assisting the exhaust turbine in taking in air from the outside of the system.

The system can further comprise a pressure reducing valve arranged between the fuel gas feeder and the first tee valve.

The system can further comprise an intercooler arranged between the second tee valve and a third input end of the internal combustion engine.

The system can further comprise a filtering device arranged at one end of the air pipeline, which removes impurities in the air, so that the air after removal of impurities enters the air pipeline.

The fuel gas feeder can be further connected to the burner.

The system can further comprise a third tee valve arranged between a first output end of the SOFC stack and a second input end of the internal combustion engine. As before a first output end of the SOFC stack is connected to a second input end of the internal combustion engine. A first output end of the SOFC stack can be connected to an input end of the third tee valve, and a first output end of the third tee valve is connected to a second input end of the internal combustion engine;

As before, an input end of the burner can be connected to an output end of the SOFC stack. A second output end of the tee valve is connected to an input end of the burner.

Compared with the prior art, the technical solution provided by the present invention has the following advantages:

The present application provides a hybrid power system, which integrates an internal combustion engine with an SOFC stack, provides fuel gas inside a fuel gas feeder for the internal combustion engine in the preheating stage of the SOFC stack at first, and provides power for the vehicle through the internal combustion engine in the preheating stage of the SOFC stack, thereby solving the problem that an SOFC stack is unable to provide power for the vehicle in the preheating stage. At the same time, the internal combustion engine burns fuel gas, outputs high temperature exhaust gas, heats the heat exchanger with the high temperature exhaust gas, then discharges the exhaust gas from an exhaust turbine and takes in air from the outside of the system. The air first passes through an air preheater, then passes through a heat exchanger and then enters the SOFC stack, preheats the air preheater through an air pipeline and then is discharged. After multiple cycles, the preheating of the SOFC stack is completed. As the air preheater is connected to the heat exchanger in series to heat the air, the heating speed of the air entering the SOFC stack is raised, the preheating time is shortened and a quick start of the SOFC stack is achieved. After the preheating is completed, power can be provided for the vehicle through the SOFC stack, the internal combustion engine stops working, and when the SOFC stack is unable to meet the power demand of the vehicle, and the internal combustion engine and the SOFC stack are controlled to provide power for the vehicle at the same time.

The internal combustion engine is used in the present application to provide power for the vehicle at first because the internal combustion engine can be started flexibly and is not restricted by temperature, and after the operating temperature of the SOFC stack is reached, only the SOFC stack is used to provide power for the vehicle. Because of the high efficiency of the SOFC stack, the working efficiency of providing power for the vehicle is raised, the shortcomings of the internal combustion engine and the SOFC stack are supplemented and power is provided for the vehicle flexibly and efficiently.

BRIEF DESCRIPTION OF THE DRAWINGS

The accompanying drawings show some embodiments of the present invention.

DETAILED DESCRIPTION

Embodiments of the present invention will be described in conjunction with the drawings. The described embodiments are only some of the embodiments of the present invention, rather than all of the embodiments.

This embodiment provides a hybrid power system, which integrates an internal combustion engine with an SOFC stack, provides power for the vehicle through the internal combustion engine in the preheating stage of the SOFC stack, and heats the SOFC stack with the high temperature exhaust gas discharged from the internal combustion engine to quickly start the SOFC stack, and the SOFC stack is used to provide power for the vehicle to raise the working efficiency.

Figure 1:
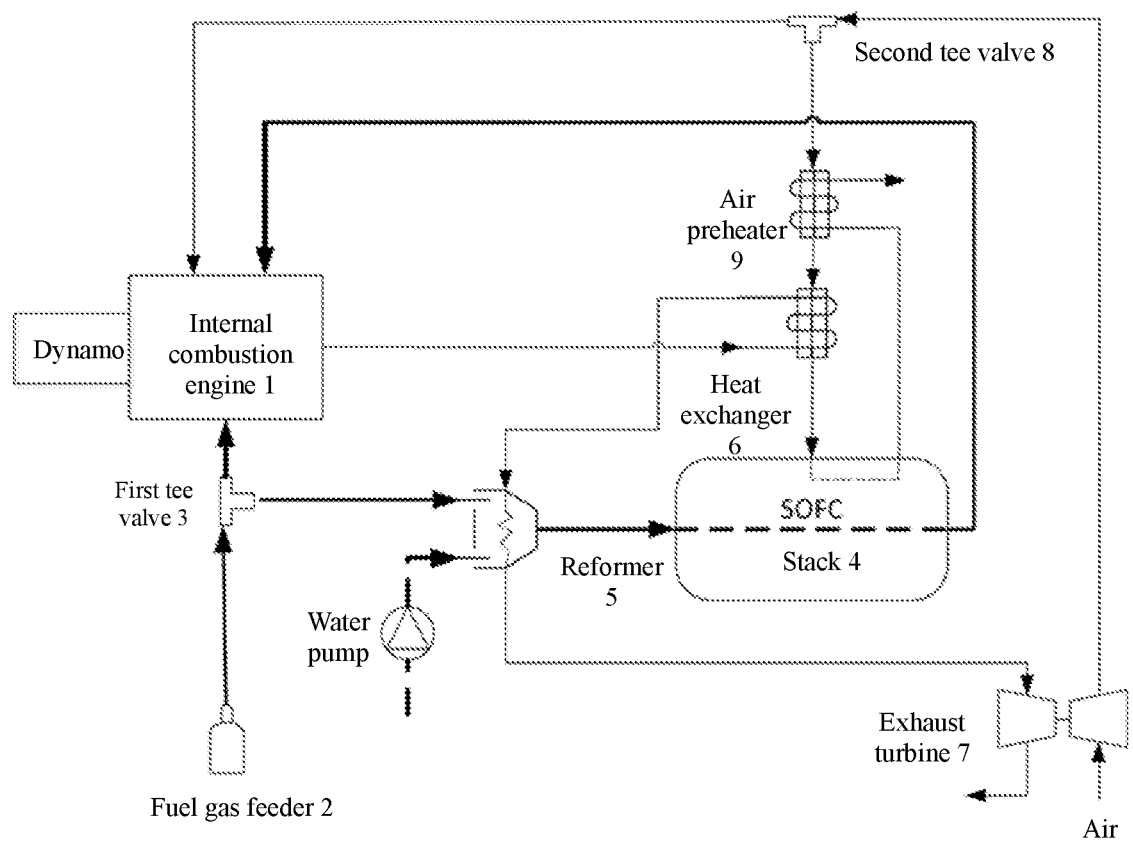
FIG. 1 is a structural schematic view of a hybrid power system.

As shown in FIG. 1, the hybrid power system may comprise an internal combustion engine 1. The internal combustion engine 1 burns fuel gas to provide power for the vehicle. In order to ensure the operation of the internal combustion engine 1, fuel gas needs to be provided for the internal combustion engine 1.

Fuel gas is stored in a fuel gas feeder 2, which provides fuel gas for the internal combustion engine 1. The fuel gas feeder 2 provides fuel gas for the internal combustion engine 1 through the following channel:

The fuel gas feeder 2 is connected to an input end of a first tee valve 3. A first output end of the first tee valve 3 is connected to a first input end of the internal combustion engine 1, so that the fuel gas in the fuel gas feeder 2 can be provided for the internal combustion engine 1 for use.

In the hybrid power system disclosed by this embodiment, in addition to that the internal combustion engine 1 is used to provide power for the vehicle, the SOFC stack 4 is also used to provide power for the vehicle. Therefore, it is required to continuously input fuel gas (hydrogen, carbon monoxide, methane, etc.) to the anode of the SOFC stack 4, and accordingly, it is also required to provide fuel gas for the SOFC stack 4 through the fuel gas feeder 2.

In the hybrid power system provided by the present invention, a second output end of the first tee valve 3 is connected to a first input end of a reformer 5, and an output end of the reformer 5 is connected to a first input end of the SOFC stack 4, so that the fuel gas inside the fuel gas feeder 2 can be provided for the SOFC stack 4 for use. Here, the first input end of the SOFC stack 4 refers to the anode of the SOFC stack 4.

The fuel gas input into the SOFC stack 4 cannot be fully consumed. In order to further raise the utilization rate of the fuel gas, a first output end of the SOFC stack 4 is connected to a second input end of the internal combustion engine 1 so that the internal combustion engine 1 reuses the fuel gas not consumed by the SOFC stack 4.

Further, because the SOFC stack 4 can also provide certain fuel gas for the internal combustion engine 1, some fuel gas that otherwise should be provided by the fuel gas feeder 2 for the internal combustion engine 1 is saved.

Through the above integration of the SOFC stack 4 and the internal combustion engine 1, fuel gas can be provided for the internal combustion engine 1 through the fuel gas feeder 2 first after the system is initially started and the SOFC stack is still in a preheating stage and unable to provide powder for the vehicle, so that the internal combustion engine 1 is used to provide power for the vehicle.

Further, when the SOFC stack is in a preheating stage, the high temperature exhaust gas discharged after the internal combustion engine 1 burns fuel gas can also be used to preheat the SOFC stack to accelerate the preheating of the SOFC stack, shorten the preheating time and achieve a quick start of the SOFC stack.

An output end of the internal combustion engine 1 is connected to an exhaust line, which is used for discharging the exhaust gas generated from fuel gas combustion in the internal combustion engine 1.

The exhaust line is arranged adjacent to the outer wall of a heat exchanger 6. As shown in FIG. 1, a ventilation pipeline is wound on the outer wall of the heat exchanger 6. The heat exchanger 6 is heated with the high temperature exhaust gas flowing through the exhaust line by means of heat exchange. Then the exhaust gas flows through the reformer 5 and then is discharged from the exhaust turbine 7.

When the exhaust turbine 7 is in an operating state, i.e., while the exhaust turbine 7 is working to discharge the exhaust gas from a side, the other side of the exhaust turbine 7 will absorb fresh air from the outside of the system. Through an air pipeline, air is transmitted to the inside of the SOFC stack 4. The fuel gas and air in the SOFC stack 4 undergo chemical reactions to provide power for the vehicle.

At the same time, air is also transmitted to the inside of the internal combustion engine 1 from an air pipeline so that air and fuel gas are mixed and combusted to provide power for the vehicle through the internal combustion engine 1.

The air pipeline is connected to an input end of a second tee valve 8, an output end of the second tee valve 8 is connected to an input end of an air preheater 9, an output end of the air preheater 9 is connect to an input end of a heat exchanger 6, and an output end of the heat exchanger 6 is connected to a second input end of an SOFC stack 4 through an air pipeline. Here, the second input end of the SOFC stack 4 is a cathode of the SOFC stack 4.

In this case, the air intake from an air inlet of the air pipeline flows through the second tee valve 8, the air preheater 9 and the heat exchanger 6 and enters the cathode of the SOFC stack 4.

It should be noted that although the air flows through the air preheater 9 first and then flows through the heat exchanger 6, the air preheater 9 has not experienced heat exchange, so the temperature of the air preheater 9 per se is too low to heat the air flowing through the air preheater 9. While the heat exchanger 6 has experienced heat exchange with the high temperature exhaust gas discharged from the internal combustion engine 1, the heat exchanger 6 at higher temperature can perform heat exchange with the air flowing through the heat exchanger 6, thereby achieving the purpose of raising the temperature of the air.

After air is input into the SOFC stack 4, the air is output from a second output end of the SOFC stack 4, and is discharged from an air pipeline connected to the second output end of the SOFC stack 4. In order to speed up the heating of the air, which will enter the cathode of the SOFC stack 4 soon, an air pipeline connected to the second output end of the SOFC stack 4 is arranged adjacent to the outer wall of the air preheater 9 in this embodiment.

As shown in FIG. 1, the air pipeline is wound on the outer wall of the air preheater 9 and the air preheater 9 is heated with the air flowing through the air pipeline by means of heat exchange. As the air in the air pipeline now has been heated with the high temperature exhaust gas, it has certain temperature. The air at the certain temperature can be used to heat the air preheater 9 to raise the temperature of the air preheater 9.

After air is continuously taken in from the outside of the system, passes through the air pipeline and flows through the second tee valve 8, the air enters the air preheater 9, is heated in the air preheater 9 for the first time, then enters the heat exchanger 6 and is heated in the heat exchanger 6 for the second time. In this way, the heating speed of the air is increased and the preheating time of the SOFC stack is shortened.

In the embodiment of the present application, the second tee valve 8 is also connected to a third input end of the internal combustion engine 1 so that the air taken in from the outside of the system is input to the inside of the internal combustion engine 1.

Through the foregoing technical solution, the hybrid power system provided by this embodiment integrates an internal combustion engine with an SOFC stack, provides fuel gas inside a fuel gas feeder for the internal combustion engine in the preheating stage of the SOFC stack at first, and provides power for the vehicle through the internal combustion engine, thereby solving the problem that an SOFC stack is unable to provide power for the vehicle in the preheating stage. At the same time, the internal combustion engine burns fuel gas, outputs high temperature exhaust gas, heats the heat exchanger with the high temperature exhaust gas, then discharges the exhaust gas from an exhaust turbine and inhales air from the outside of the system. The air first passes through an air preheater, then passes through a heat exchanger and then enters the SOFC stack, preheats the air preheater through an air pipeline and then is discharged. After multiple cycles, preheating of the SOFC stack is completed. As the air preheater is connected to the heat exchanger in series to heat the air, the heating speed of the air entering the SOFC stack is raised, the preheating time is shortened and a quick start of the SOFC stack is achieved. After the preheating is completed, power can be provided for the vehicle through the SOFC stack, the internal combustion engine stops working, and when the SOFC stack is unable to meet the power demand of the vehicle, and the internal combustion engine and the SOFC stack are controlled to provide power for the vehicle at the same time.

The internal combustion engine is used in the present application to provide power for the vehicle at first because the internal combustion engine can be started flexibly and is not restricted by temperature, and after the operating temperature of the SOFC stack is reached, only the SOFC stack is used to provide power for the vehicle. Because of the high efficiency of the SOFC stack, the working efficiency of providing power for the vehicle is raised, the shortcomings of the internal combustion engine and the SOFC stack are supplemented and power is provided for the vehicle flexibly and efficiently.

Figure 2:
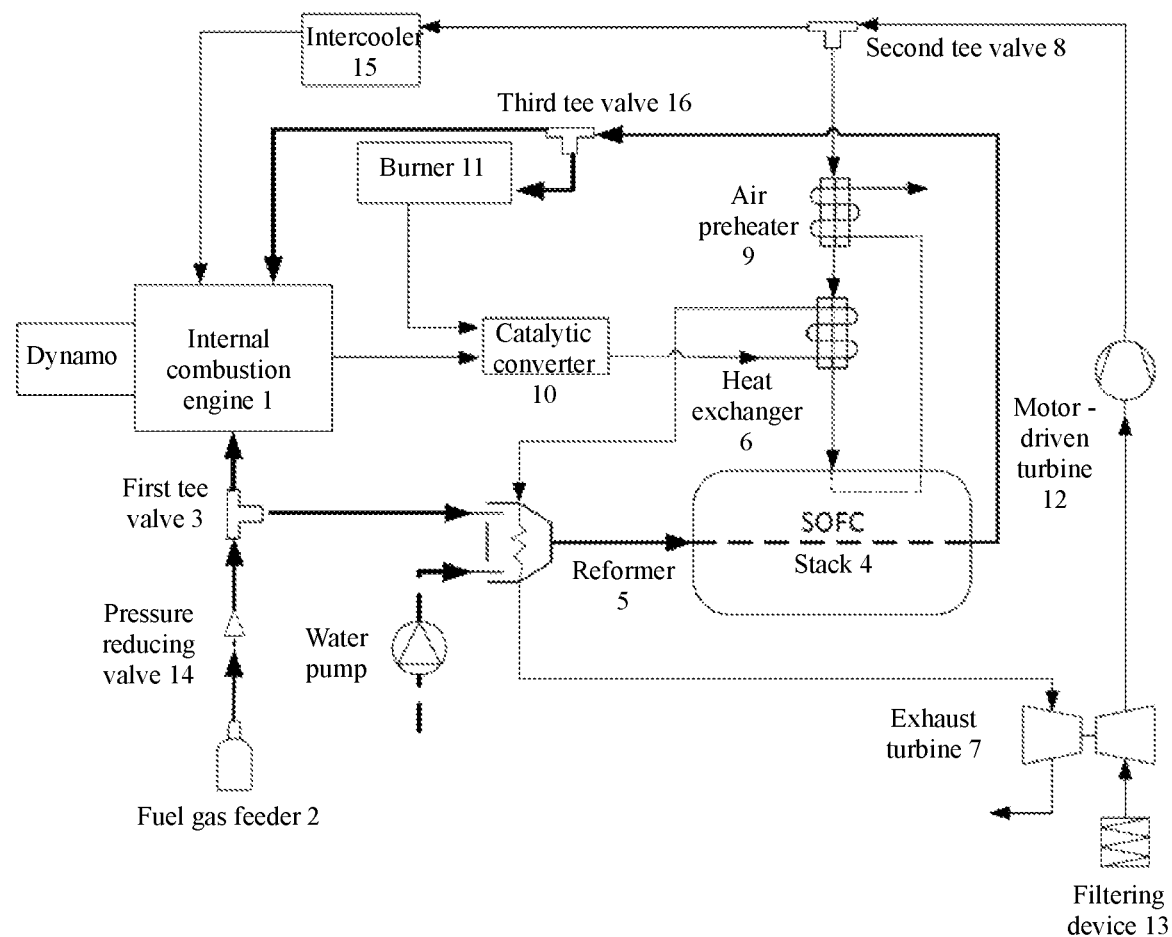
FIG. 2 is another structural schematic view of a hybrid power system.

During emission of the exhaust gas, in order to meet the emission standard, the present application further provides another hybrid power system, as shown in FIG. 2. On the basis shown in FIG. 1, the hybrid power system further comprises a catalytic converter 10.

The catalytic converter 10 is arranged at an output end of the internal combustion engine 1. Before exhaust gas is emitted from an exhaust line, the exhaust gas is purified in the catalytic converter 10 to meet the emission standard.

An output end of the internal combustion engine 1 is connected to an exhaust line, and is connected to a first input end of the catalytic converter 10 through the exhaust line; the exhaust line at an output end of the catalytic converter 10 is arranged adjacent to the outer wall of a heat exchanger 6, and the exhaust gas generated from combustion of fuel gas in the internal combustion engine 1 flows through the exhaust line and the reformer 5 and then is discharged from an exhaust turbine 7.

In other embodiments, the hybrid power system may further comprise a burner 11.

An input end of the burner 11 is connected to an output end of the SOFC stack 4, and an output end of the burner 11 is connected to a second input end of the catalytic converter 10. In this way, the fuel gas output from the SOFC stack 4 and not fully utilized can enter the burner 11. After combustion in the burner 11, the burner 11 together with the internal combustion engine 1 provides power for the vehicle. The exhaust gas generated from combustion of fuel gas in the burner 11 is also emitted after purification in the catalytic converter 10.

The provision of the burner 11 can raise the utilization rate of fuel gas.

In other embodiments, considering that the intake air needs to have a certain flow so as to meet the air demand of the SOFC stack and the air demand of the internal combustion engine, inhaling air from the outside of the system by the exhaust turbine alone cannot meet the air flow requirements under some circumstances. To address this problem, the hybrid power system provided by this embodiment further comprises a motor-driven turbine 12, which is connected to the exhaust turbine 7 in series and assists the exhaust turbine 7 inhaling air from the outside of the system to meet the air demand of the hybrid power system.

In order to filter out impurities in the air, a filtering device 13, a filter element for example, is arranged at an air inlet of the air pipeline. The impurities in the air are removed by the filter element.

In other embodiments, when the fuel gas feeder 2 is a gas cylinder, the pressure of the fuel gas directly output from the gas cylinder is high, and needs to be reduced before it is provided for the internal combustion engine 1 and the SOFC stack 4, so a pressure reducing valve 14 is arranged between the fuel gas feeder 2 and the first tee valve 3.

In other embodiments, an intercooler 15 is arranged on a pipeline through which air is provided for the internal combustion engine 1, i.e., an intercooler 15 is arranged between the second tee valve 8 and a third input end of the internal combustion engine 1.

In other embodiments, the fuel gas feeder 2 is also connected to a burner to provide fuel gas for the burner so that the burner and the internal combustion engine both burn the fuel gas. In this way, not only power is provided for the vehicle but also the temperature rise speed of the air in the SOFC stack is increased and the preheating time of the SOFC stack is shortened.

In other embodiments, the third tee valve 16 is arranged to divide the fuel gas output by the SOFC stack into two branches, one branch is input to the burner and the other branch is input to the internal combustion engine.

In order to better understand the hybrid power system disclosed by the present invention, the working principle of the hybrid power system is described below.

Working principle: After the pressure of fuel gas is reduced by a pressure reducing valve, the fuel gas is divided into two branches, one branch is connected to an internal combustion engine, and the other branch is connected to a reformer to provide fuel for power generation of the SOFC stack.

After the vehicle is started, firstly the internal combustion engine works in a high efficiency zone by making use of the advantage of hybrid power of the internal combustion engine and the energy storage cell, to drive the dynamo to provide power for the vehicle. The motor drives wheels through a gearbox, thereby achieving the purpose of providing power and electricity for the vehicle.

The high temperature exhaust gas discharged after combustion of fuel gas in the internal combustion engine is first purified in a three-way catalytic converter and then passes through a heat exchanger, a reformer and an exhaust turbine and then is output, and fresh air passes through a filter element into an internal combustion engine and an SOFC stack. In the process of discharging the high temperature exhaust gas, the exhaust gas passes through a heat exchanger, but it only exchanges heat with the heat exchanger so that the waste heat of the exhaust gas is used to heat the air subsequently entering the heat exchanger and eventually enters the SOFC stack.

The pressurized air is distributed at the second tee valve to the internal combustion engine and the SOFC stack. The air needs to enter the air preheater at first before entering the heat exchanger. After the air enters the heat exchanger, it exchanges heat with the high temperature exhaust gas discharged from the internal combustion engine to raise temperature, thereby achieving a hot start of the SOFC stack.

In order to achieve a quick start of the SOFC stack, the fuel gas feeder can be connected to the burner to supply fuel gas to the burner. The burner is further connected to an output end of the SOFC stack to mix and burn the fuel gas discharged from the SOFC stack inside the burner, and output high temperature exhaust gas from the burner. The high temperature exhaust gas output from the burner and the high temperature exhaust gas output by the internal combustion engine exchanges heat with the heat exchanger to achieve the purpose of heating the air entering the SOFC stack. As the high temperature exhaust gas is increased, the air entering the SOFC stack can be heated up fast to achieve a quick hot start of the SOFC stack; moreover, as more exhaust gas is discharged, the exhaust turbine will compress more fresh air into the system, thereby further raising the speed of the hot start of the SOFC stack and shorten the preheating time of the SOFC stack.

After the reformer and the SOFC stack reach the operating temperature, the water pump starts working, and steam and fuel are partially reacted under the catalysis of high temperature in the reformer to perform reforming.

After the steam and fuel gas are mixed evenly at a specific ratio, they absorb heat in the reformer and carry out chemical reaction to become hydrogen and carbon monoxide, which are provided for the SOFC stack. The SOFC stack begins to output electricity and drive the motor to output power. When the power demand of the motor is reduced, the electricity output by the SOFC stack is used to charge the energy storage cell.

The SOFC stack outputs electricity, the hot start of the SOFC stack is over, the motor-driven turbine is started and works in replacement of the exhaust turbine, and the internal combustion engine may stop working and no longer provide fuel gas additionally for the burner. Instead, the anode exhaust gas discharged from the SOFC stack is cooled in the air preheater and then enters the burner and is burnt to maintain the thermal demand of the whole system. After the internal combustion engine is shut down, the SOFC stack provides electricity and power for the vehicle.

When the power demand of the vehicle is large and the internal combustion engine and the SOFC system need to work simultaneously, the third tee valve can be switched so that the anode exhaust gas of the SOFC stack enters the internal combustion engine for continued combustion to raise the utilization rate of the fuel.

The embodiments in the description are all described in a progressive manner, each embodiment focuses on the differences from other embodiments and the same or similar parts among the embodiments can be mutually referred to.

Above are merely preferred implementations of the present invention. Various changes and modifications may be made without departing from the principle of the invention and these changes and modifications should also be within the scope of protection of the invention.

The invention claimed is:

1. A hybrid power system, comprising an internal combustion engine and an SOFC stack, wherein:
   a first input end of the internal combustion engine is connected to a first output end of a first tee valve;
   an input end of the first tee valve is connected to a fuel gas feeder;
   a second output end of the first tee valve is connected to a first input end of a reformer;
   an output end of the reformer is connected to a first input end of the SOFC stack;
   a first output end of the SOFC stack is connected to a second input end of the internal combustion engine;
   an output end of the internal combustion engine is connected to an exhaust line, which is arranged adjacent to an outer wall of a heat exchanger, wherein exhaust gas generated from combustion of fuel gas in the internal combustion engine flows through the exhaust line and the reformer and then is discharged from an exhaust turbine;
   the exhaust turbine takes in air from an air pipeline while discharging exhaust gas;
   the air pipeline is connected to a second tee valve;
   the second tee valve is connected to an air preheater, and the air preheater is connected to the heat exchanger;
   an air pipeline connected to an output end of the heat exchanger is connected to a second input end of the SOFC stack;
   air is input to the inside of the SOFC stack through the air pipeline and discharged from an air pipeline connected to a second output end of the SOFC stack;
   the air pipeline connected to the second output end of the SOFC stack is arranged adjacent to the outer wall of the air preheater; and
   the second tee valve is further connected to a third input end of the internal combustion engine to provide air for the internal combustion engine.

2. The hybrid power system according to claim 1, further comprising a catalytic converter, wherein:
- an output end of the internal combustion engine is connected to the exhaust line, and is connected to a first input end of the catalytic converter through the exhaust line; and
- an exhaust line at an output end of the catalytic converter is arranged adjacent to the outer wall of a heat exchanger, and the exhaust gas generated from combustion of fuel gas in the internal combustion engine flows through the exhaust line and the reformer and then is discharged from an exhaust turbine.

3. The hybrid power system according to claim 2, further comprising a burner, wherein an input end of the burner is connected to an output end of the SOFC stack, and an output end of the burner is connected to a second input end of the catalytic converter.

4. The system according to claim 3, wherein the system further comprises: a third tee valve arranged between a first output end of the SOFC stack and a second input end of the internal combustion engine;
- a first output end of the SOFC stack is connected to a second input end of the internal combustion engine, to be specific: a first output end of the SOFC stack is connected to an input end of the third tee valve, and a first output end of the third tee valve is connected to a second input end of the internal combustion engine;
- an input end of the burner is connected to an output end of the SOFC stack, to be specific:
  - a second output end of the tee valve is connected to an input end of the burner.

5. The system according to claim 1, further comprising a motor-driven turbine connected to the exhaust turbine in series and assisting the exhaust turbine in taking in air from the outside of the system.

6. The system according to claim 5, further comprising a pressure reducing valve arranged between the fuel gas feeder and the first tee valve.

7. The system according to claim 1, further comprising an intercooler arranged between the second tee valve and a third input end of the internal combustion engine.

8. The system according to claim 1, further comprising a filtering device arranged at one end of the air pipeline, which removes impurities in the air, so that the air after removal of impurities enters the air pipeline.

9. The system according to claim 1, wherein the fuel gas feeder is further connected to the burner.

* * * * *